US011760364B2

(12) United States Patent
Alt et al.

(10) Patent No.: US 11,760,364 B2
(45) Date of Patent: Sep. 19, 2023

(54) METHOD FOR DETERMINING CONTROL PARAMETERS FOR A CONTROL SYSTEM

(71) Applicant: Robert Bosch GmbH, Stuttgart (DE)

(72) Inventors: Benedikt Alt, Heimsheim (DE); Michael Herman, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 397 days.

(21) Appl. No.: 17/107,376

(22) Filed: Nov. 30, 2020

(65) Prior Publication Data

US 2021/0179118 A1 Jun. 17, 2021

(30) Foreign Application Priority Data

Dec. 13, 2019 (DE) .......................... 102019219534.2

(51) Int. Cl.
 B60W 50/00 (2006.01)
 G06N 20/00 (2019.01)
 G06N 5/04 (2023.01)

(52) U.S. Cl.
 CPC ........... B60W 50/0098 (2013.01); G06N 5/04 (2013.01); G06N 20/00 (2019.01); B60W 2050/0083 (2013.01); B60W 2540/30 (2013.01)

(58) Field of Classification Search
 CPC ..... B60W 50/0098; B60W 2050/0083; B60W 2540/30; G06N 20/00; G06N 5/04
 See application file for complete search history.

(56) References Cited

U.S. PATENT DOCUMENTS

| | | | | |
|---|---|---|---|---|
| 11,584,379 B2* | 2/2023 | Misu | ...................... | B60W 40/09 |
| 11,586,204 B2* | 2/2023 | Potnis | ................... | B60W 40/09 |
| 2020/0031371 A1* | 1/2020 | Soliman | ................ | B60W 10/04 |
| 2021/0146964 A1* | 5/2021 | Rus | ................... | B60W 60/0015 |
| 2022/0324449 A1* | 10/2022 | Shi | ...................... | B60W 60/005 |

FOREIGN PATENT DOCUMENTS

| | | |
|---|---|---|
| DE | 102018130566 A1 | 6/2019 |
| DE | 102019129232 A1 | 5/2020 |

OTHER PUBLICATIONS

Siddharthan Rajasekaran, et al., "Inverse Reinforce Learning With Nonparametric Behavior Clustering," Cornell University Library, 2017, pp. 1-9. <https://arxiv.org/pdf/1712.05514v1>; Downloaded Nov. 30, 2020.
Kuderer, Markus, Shilpa Gulati, and Wolfram Burgard: "Learning Driving Styles for Autonomous Vehicles From Demonstration," International Conference on Robotics and Automation (ICRA), 2015, pp. 1-6. Downloaded Nov. 30, 2020.

* cited by examiner

*Primary Examiner* — Peter D Nolan
*Assistant Examiner* — Mikko Okechukwu Obioha
(74) *Attorney, Agent, or Firm* — NORTON ROSE FULBRIGHT US LLP; Gerard Messina

(57) ABSTRACT

A computer-implemented method for using machine learning to determine control parameters for a control system, in particular of a motor vehicle, in particular for controlling a driving operation of the motor vehicle. The method includes: providing a set of travel trajectories; deriving reward functions from the travel trajectories, using an inverse reinforcement learning method; deriving driver type-specific clusters based on the reward functions; determining control parameters for a particular driver type-specific cluster.

11 Claims, 3 Drawing Sheets

METHOD FOR DETERMINING CONTROL PARAMETERS FOR A CONTROL SYSTEM

CROSS REFERENCE

The present application claims the benefit under 35 U.S.C. § 119 of German Patent Application No. DE 102019219534.2 filed on Dec. 13, 2019, which is expressly incorporated herein by reference in its entirety.

FIELD

The present invention relates to a method for using machine learning to determine control parameters for a control system, in particular of a motor vehicle, in particular for controlling a driving operation of the motor vehicle.

Moreover, the present application relates to a method for controlling a motor vehicle using a control system.

Furthermore, the present invention relates to a control system according to the present application.

BACKGROUND INFORMATION

Control systems are used in a motor vehicle as driving assistance systems, for example, in order to assist or relieve a driver of the motor vehicle in certain driving situations.

For implementing these assistance functions, a driver assistance system includes surroundings sensors such as radar sensors, LIDAR sensors, laser scanners, video sensors, and ultrasonic sensors. If a vehicle is equipped with a navigation system, the driver assistance system may also revert to data of this system. In addition, the driver assistance system, which is connected to the vehicle electrical system preferably via at least one bus, preferably the CAN bus, may also actively intervene in vehicle electrical systems, such as in particular the steering system, the braking system, the drive train, and warning systems.

In the available control systems, uniform parameterization of the control system is generally used within a vehicle fleet. If necessary, the control system may also be adapted to a sport mode or a comfort mode. An individual adaptation to the driving behavior of an individual driver has not been known thus far.

It is therefore desirable to provide a control system that allows such an individual adaptation to the driving behavior of an individual driver.

SUMMARY

This may be achieved by a control system and a computer-implemented method according to an example embodiment of the present invention.

Preferred specific embodiments relate to a computer-implemented method for using machine learning to determine control parameters for a control system, in particular of a motor vehicle, in particular for controlling a driving operation of the motor vehicle. In accordance with an example embodiment of the present invention, the method includes:

providing a set D of travel trajectories;
deriving reward functions from the travel trajectories, using an inverse reinforcement learning method;
deriving driver type-specific clusters based on the reward functions;
determining control parameters for a particular driver type-specific cluster.

Different driver types are clustered in a learning phase, based on a set of travel trajectories. The property of a cluster is that objects in the same cluster have similar, in particular identical, properties, and thus differ from objects that are not in the same cluster. In an application phase of the control system, the control system may then be individually adapted to the driving behavior of a particular driver by selecting a certain driver type-specific cluster. The travel trajectories are advantageously based on driving demonstrations of different drivers or driver types.

A reward function is a function that associates a reward value with a value of a control variable. A reward function is advantageously selected in such a way that it assumes larger values the smaller the deviation is of the control variable from a setpoint variable. According to the present invention, for a particular travel trajectory the particular reward function that is optimized in the travel trajectory is determined.

The derivation of the reward functions takes place by using an inverse reinforcement learning method, for example using an algorithm for inverse reinforcement learning. The method and an example of the algorithm are provided, for example, at https://arxiv.org/pdf/1712.05514.pdf: "Inverse Reinforce Learning with Non-parametric Behavior Clustering," Siddharthan Rajasekaran, Jinwei Zhang, and Jie Fu.

The driver type clusters are then derived, based on the reward functions.

A reward function describes in particular states and actions that are desired by a particular driver. The reward function may thus correspond in particular to the objectives and desires of an individual driver, such as maintaining a certain distance from a third-party vehicle, an acceleration, and a speed. The reward functions therefore represent a rational action of the driver, and may generalize situations better than direct imitation of the driving behavior. Generalization of results may be advantageously achieved by clustering the reward functions derived from the travel trajectories, and in particular not from the travel trajectories themselves.

In a further preferred specific embodiment of the present invention, it is provided that the travel trajectories include operating data of the motor vehicle and/or reference data of the motor vehicle concerning the surroundings of the motor vehicle, and the reward function takes the operating data and/or reference data into account.

Examples of features are described, for example, in Kuderer, Markus, Shilpa Gulati, and Wolfram Burgard: "Learning driving styles for autonomous vehicles from demonstration," 2015 IEEE, International Conference on Robotics and Automation (ICRA), IEEE, 2015, which may be incorporated into the reward function, such as in particular accelerations, speeds, or distance from a lane center. In particular, further features such as a distance from a third-party vehicle, in particular a preceding vehicle and/or other vehicles, or a relative speed between the motor vehicle and a third-party vehicle, may advantageously be incorporated.

In a further preferred specific embodiment of the present invention, it is provided that an in particular driver type-specific driving strategy is computed for a driver type-specific cluster.

In a further preferred specific embodiment of the present invention, it is provided that the control parameters of a driver type-specific cluster are optimized as a function of the reward function of the particular cluster and/or as a function of operating data of the motor vehicle and/or reference data of the motor vehicle concerning the surroundings of the motor vehicle. The control parameters may advantageously be optimized using the optimization function $$\theta_j = \mathrm{argmax}_{\theta_j} \mathbb{E}\left[\sum_{t=0}^{T_{max}} r_j(x, a) \,|\, p(x_{t+1} \,|\, x_t, a_t), \pi_{\theta_j}(a \,|\, s)\right]$$

In the optimization function provided as an example, $r_j$ describes a reward function of a cluster j, $\theta_j$ describes the control parameters of a controller $\pi_{\theta_j}$ of cluster j, and $p(x_{t+1}|x_t, a_t)$ $x_t^{own}$ describes the distribution over future states, including a state from the forward model of the host vehicle as well as the behavior of a reference object, in particular a third-party vehicle, state $x_t$ including the state of the host vehicle as well as the state of a reference object, in particular a third-party vehicle, at a point in time t. The solution of the optimization function identifies parameters $\theta_j$ for which the reward function is at a maximum, and thus optimal with regard to the objectives and desires of the driver extracted in the first step.

In a further preferred specific embodiment of the present invention, it is provided that the control parameters are optimized for at least one control situation. A control situation includes a use case of the controller, for example an adaptive cruise control (ACC), a parking assistance, or a lane-keeping support (LKS).

Further preferred specific embodiments of the present invention relate to methods for controlling a motor vehicle using a control system. In accordance with an example embodiment of the present invention, the method includes: providing a set of driver type-specific clusters, a particular driver type-specific cluster that includes a reward function and control parameters, the driver type-specific clusters and/or the control parameters having been determined according to a method according to at least one of the specific embodiments; observing a driving behavior of a driver in a driving operation of the motor vehicle; identifying a driver type-specific cluster from the set of driver type-specific clusters, based on the observed driving behavior; and parameterizing the control system, in particular a model of the control system, using control parameters of the identified driver type-specific cluster.

In a further preferred specific embodiment of the present invention, it is provided that the identification of a cluster includes: evaluating the driving behavior based on the reward functions of the driver type-specific clusters. The derived reward functions are advantageously used for identifying a cluster. The behavior of the driver is evaluated, in particular over a certain time period, based on the reward functions of the driver type-specific clusters, and a certain driver type-specific cluster is selected based on the average reward. The selected driver type-specific cluster advantageously optimizes the function $$j = \mathrm{argmax}_j \frac{1}{|D_D|} \sum_{(x,a) \in D_D} r_j(x, a),$$

where $D_D$ contains the observed shared states of the host motor vehicle and of the preceding vehicle. Similarly, a driver type-specific cluster of a driver type with preferably similar objectives and desires is selected.

In a further preferred specific embodiment of the present invention, it is provided that the identification of a driver type-specific cluster includes: evaluating the driving behavior based on a driving strategy of the driver. The in particular driver type-specific driving strategy that is learned by applying the inverse reinforcement learning method is advantageously used for identifying a cluster. Based on the selected driving actions, for example acceleration, braking, steering, etc., the behavior of the driver is compared, in particular over a certain time period, to that of learned driving strategy $\pi_j$ of the inverse reinforcement step, and the driver type-specific cluster whose application would have resulted in the selection of the most similar, in particular identical, driving actions is selected. The selected driver type-specific cluster advantageously optimizes the function $$j = \mathrm{argmin} \frac{1}{|D_D|} \sum_{(x,a) \in D_D} L(x, a, \pi_j),$$

where $L(x, a, \pi_j)$ is a distance measure that compares observed state action tuples to driving strategy $\pi_j$ of the driver type-specific cluster. Similarly, the driver type-specific cluster whose application would have resulted in the selection of the most similar, in particular identical, driving actions is selected.

In a further preferred specific embodiment of the present invention, it is provided that the identification of a driver type-specific cluster includes: evaluating the driving behavior based on control parameters as a function of a control situation. The control parameter that is learned with application of the inverse reinforcement learning method is advantageously used for identifying a cluster. Based on the selected driving actions, for example acceleration, braking, steering, etc., the behavior of the driver is compared, in particular over a certain time period, to that of learned driving strategy controller strategy $\pi_{\theta_j}$ of the selected control situation, and the driver type-specific cluster whose application would have resulted in the selection of the most similar, in particular identical, driving actions is selected. The selected driver type-specific cluster advantageously optimizes the function $$j = \mathrm{argmin} \frac{1}{|D_D|} \sum_{(x,a) \in D_D} L(x, a, \pi_{\theta_j}),$$

where $L(x, a, \pi\theta j)$ is a distance measure that compares observed state action tuples to driving strategy $\pi_{\theta_j}$. Similarly, the driver type-specific cluster whose application would have resulted in the selection of the most similar, in particular identical, driving actions is selected.

In a further preferred specific embodiment of the present invention, an adaptive driver model of the control system is parameterized, using the control parameters of the selected driver type-specific cluster, and the control system is used for controlling the motor vehicle, in particular a driving operation of the motor vehicle. After a time increment, the vehicle as well as a reference object, in particular a third-party vehicle, in particular a preceding vehicle, have moved, in particular moved relative to one another and/or moved further, and steps of the method for controlling a motor vehicle using a control system, in particular the step for identifying a driver type-specific cluster and/or the parameterization of the control system using control parameters of the identified driver type-specific cluster, are carried out anew. The method may advantageously be carried out iteratively during a driving operation of the motor vehicle.

Further preferred specific embodiments of the present invention relate to a control system for a motor vehicle, in particular for controlling a driving operation of the motor vehicle, including an identification module for identifying a driver type-specific cluster according to a method according to at least one of the specific embodiments, and a controller that is designed to output at least one control variable using a model, the model being parameterizable as a function of a driver type-specific cluster that is identified according to a method according to at least one of the specific embodiments.

In a further preferred specific embodiment of the present invention, it is provided that the model maps a behavior of the motor vehicle and a behavior of the surroundings of the motor vehicle.

Further features, application options, and advantages of the present invention result from the following description of exemplary embodiments of the present invention illustrated in the figures. All described or illustrated features, alone or in any arbitrary combination, constitute the subject matter of the present invention, regardless of their wording or illustration in the description or figures, respectively.

DETAILED DESCRIPTION OF EXAMPLE EMBODIMENTS

Figure 1:
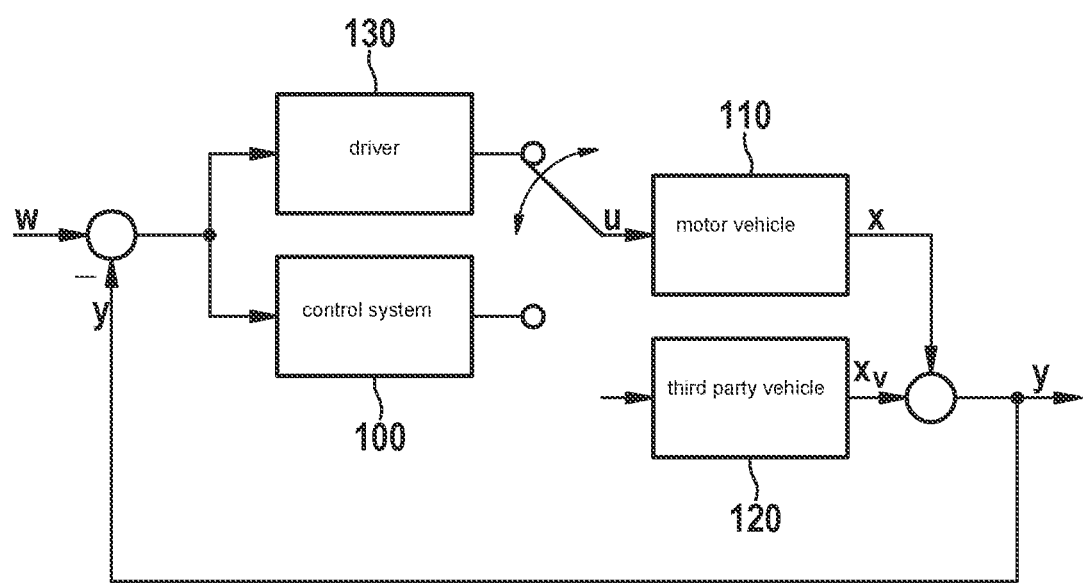
FIG. 1 shows a schematic illustration of a control function of a control system of a motor vehicle, in accordance with an example embodiment of the present invention.

FIG. 1 shows a schematic illustration of a control function of a control system 100, in particular a driver assistance system, of a motor vehicle 110, using the example of adaptive cruise control. For implementing assistance functions, a driver assistance system includes surroundings sensors such as radar sensors, LIDAR sensors, laser scanners, video sensors, and ultrasonic sensors. If a vehicle is equipped with a navigation system, the driver assistance system may also revert to data of this system. In addition, the driver assistance system, which is connected to the electrical system of vehicle 110 preferably via at least one bus, preferably the CAN bus, may also actively intervene in vehicle electrical systems, such as in particular the steering system, the braking system, the drive train, and warning systems.

In one embodiment of the present invention, control system 100 is designed as a control unit for motor vehicle 110. The control unit may include a computer, in particular a microprocessor or a data processor. The control unit may include a memory for instructions which the computer may carry out.

Control system 100 for motor vehicle 110 is designed for outputting a control variable u. Based on control variable u, a control variable y of a motor vehicle is settable by suitable control operations in order to adapt control variable y to a command variable w of the control system.

In adaptive cruise control, the position of the host vehicle is generally compared to the distance from a preceding vehicle 120, and the distance is set to a predefined setpoint value by targeted acceleration and/or braking interventions. This setpoint value is to be selected in such a way that the distance between the two vehicles does not fall below the legally required distance. On the other hand, the distance should not become large enough that the preceding vehicle can no longer be reliably detected. For this purpose, camera- or radar-based sensor systems are generally used, and an actual value is generated from same which is used as an input value for the control algorithm for the adaptive cruise control. The adaptive cruise control is in operation, for example, when a driver 130 switches on the function. The function is either switched off by driver 130 or it switches itself off, for example when a braking intervention suddenly takes place.

It is explained below, with reference to FIGS. 2 through 4, how control system 100 may be adapted to the driving behavior of an individual driver.

Figure 2:
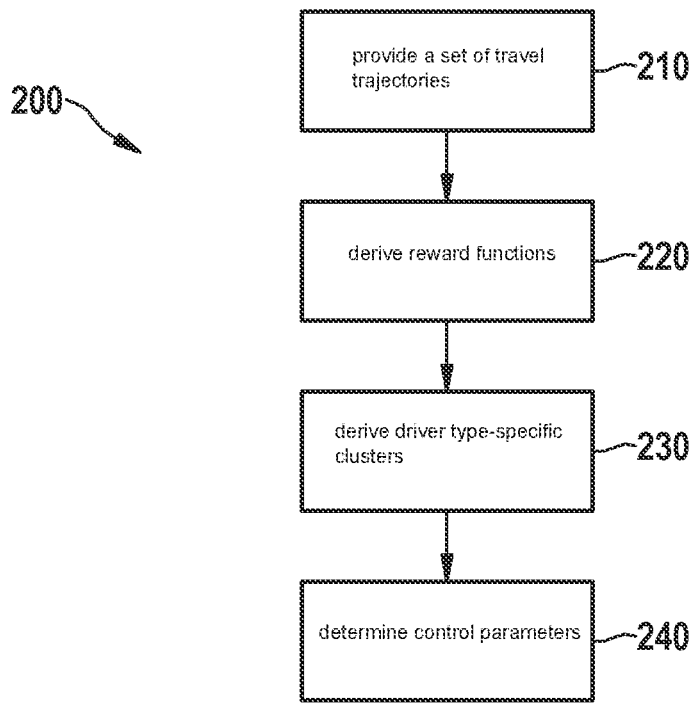
FIG. 2 shows a schematic illustration of steps of a method for using machine learning to determine control parameters for a control system, in particular of a motor vehicle, in accordance with an example embodiment of the present invention.

FIG. 2 shows steps of a method 200 for using machine learning to determine control parameters for control system 100. Method 200 includes the following steps:

a step 210 for providing a set D of travel trajectories;

a step 220 for deriving reward functions $R_j$ from travel trajectories D, using an inverse reinforcement learning method;

a step 230 for deriving driver type-specific clusters C based on reward functions $R_j$, and a step 240 for determining control parameters $\theta_j$ for a particular driver type-specific cluster $C_j$.

Method 200 shows steps of a learning phase for control system 100. Different driver types $C_j$ are clustered in a learning phase, based on set D of travel trajectories. The property of a cluster is that objects in the same cluster have similar, in particular identical, properties, and thus differ from objects that are not in the same cluster. In an application phase of control system 100, control system 100 may then be individually adapted to the driving behavior of a particular driver by selecting a certain driver type-specific cluster $C_j$. Travel trajectories D are advantageously based on driving demonstrations of different drivers or driver types.

Reward function $R_j$ is a function that associates a reward value with a value of a control variable. A reward function is advantageously selected in such a way that it assumes larger values the smaller the deviation of the control variable from a setpoint variable. According to the present invention, for a particular travel trajectory d the particular reward function $r_j$ that is optimized in travel trajectory d is determined.

The derivation of reward function R takes place by using an inverse reinforcement learning method, for example using an algorithm for inverse reinforcement learning. The method and an example of the algorithm are provided, for example, at https://arxiv.org/pdf/1712.05514.pdf: "Inverse Reinforce Learning with Nonparametric Behavior Clustering," Siddharthan Rajasekaran, Jinwei Zhang, and Jie Fu.

Driver type clusters $C_j$ are then derived, based on reward functions $R_j$.

Reward function $R_j$ describes in particular states and actions that are desired by a particular driver. The reward function may thus correspond in particular to the objectives and desires of an individual driver, such as maintaining a certain distance from a third-party vehicle 120, an acceleration, and a speed. Reward functions $R_j$ therefore represent a rational action of the driver, and may generalize situations better than direct imitation of the driving behavior. Generalization of results may be advantageously achieved by clustering reward functions $R_j$ derived from travel trajectories D, and in particular not from the travel trajectories themselves.

In a further preferred specific embodiment, it is provided that the travel trajectories include operating data of the motor vehicle and/or reference data of the motor vehicle concerning the surroundings of the motor vehicle, and the reward function takes the operating data and/or reference data into account. Operating data of the motor vehicle are, for example, speed, acceleration, steering angle, and inclination. Surroundings data of the motor vehicle are, for example, information concerning the roadway condition, weather, roadway gradient, course of the roadway, etc.

Examples of features are described, for example, in Kuderer, Markus, Shilpa Gulati, and Wolfram Burgard: "Learning driving styles for autonomous vehicles from demonstration," 2015 IEEE, International Conference on Robotics and Automation (ICRA), IEEE, 2015, which may be incorporated into the reward function, such as in particular accelerations, speeds, or distance from a lane center. In particular, further features such as a distance from a third-party vehicle 120, in particular a preceding vehicle and/or other vehicles, or a relative speed between motor vehicle 110 and a third-party vehicle 120, may advantageously be incorporated.

In a further preferred specific embodiment of the present invention, it is provided that an in particular driver type-specific driving strategy is computed for a driver type-specific cluster $C_j$.

In a further preferred specific embodiment of the present invention, it is provided that control parameters $\theta_j$ of a driver type-specific cluster $C_j$ are optimized as a function of reward function $R_j$ of particular cluster $C_j$ and/or as a function of operating data of motor vehicle 110 and/or reference data of motor vehicle 110 concerning the surroundings of the motor vehicle. The control parameters may advantageously be optimized using the optimization function $$\theta_j = \mathrm{argmax}_{\theta_j} \mathbb{E}\left[\sum_{t=0}^{T_{max}} r_i(x, a) \mid p(x_{t+1} \mid x_t, a_t), \pi_{\theta_j}(a \mid s)\right]$$

In the optimization function provided as an example, $r_j$ describes a reward function of a cluster j, $\theta_j$ describes the control parameters of a controller $\pi\theta_j$ of cluster j, and $p(x_{+1}|x_t, a_t)$ describes the distribution over future states, including a state from the forward model of the host vehicle as well as the behavior of a reference object, in particular a third-party vehicle, state $x_t$ including the state of the host vehicle as well as the state of a reference object, in particular a third-party vehicle, at a point in time t. The solution of the optimization function identifies parameters $\theta_j$ for which reward function r is at a maximum, and thus optimal with regard to the objectives and desires of the driver extracted in the first step.

In a further preferred specific embodiment of the present invention, it is provided that control parameters $\theta_j$ are optimized for at least one control situation. A control situation includes a use case of the controller, for example an adaptive cruise control (ACC), a parking assistance, or a lane-keeping support (LKS).

FIG. 2 shows steps of a method 300 for controlling a motor vehicle 110 using a control system 100.

Method 300 includes the following steps:
a step 310 for providing a set of driver type-specific clusters $C_1$, a particular driver type-specific cluster $c_j$ that includes a reward function $r_j$ and control parameters $\theta_j$, driver type-specific clusters $C_j$ and/or control parameters $\theta_j$ having been determined using a method 200 according to the specific embodiments described above;
a step 320 for observing a driving behavior of a driver 130 in a driving operation of motor vehicle 110;
a step 330 for identifying a driver type-specific cluster $c_j$ from the set of driver type-specific clusters $C_j$, based on the observed driving behavior; and a step 340 for parameterizing control system 100, in particular a model of control system 100, using control parameters $\theta_j$ of identified driver type-specific cluster $c_j$.

In a further preferred specific embodiment of the present invention, it is provided that identification 330 of a cluster $c_j$ includes: evaluating the driving behavior based on the reward functions of the driver type-specific clusters. The derived reward functions are advantageously used for identifying a cluster. The behavior of the driver is evaluated, in particular over a certain time period, based on the reward functions of the driver type-specific clusters, and a certain driver type-specific cluster is selected based on the average reward. The selected driver type-specific cluster advantageously optimizes the function $$j = \mathrm{argmax}_j \frac{1}{|D_D|} \sum_{(x,a) \in D_D} r_j(x, a),$$

where $D_D$ contains the observed shared states of the host motor vehicle and of the preceding vehicle. Similarly, a driver type-specific cluster of a driver type with preferably similar objectives and desires is selected.

In a further preferred specific embodiment of the present invention, it is provided that identification 330 of a driver type-specific cluster $c_j$ includes: evaluating the driving behavior based on a driving strategy of the driver. The in particular driver type-specific driving strategy that is learned by applying the inverse reinforcement learning method is advantageously used for identifying a cluster. Based on the selected driving actions, for example acceleration, braking, steering, etc., the behavior of the driver is compared, in particular over a certain time period, to that of learned driving strategy $\pi_j$ of the inverse reinforcement step, and the driver type-specific cluster whose application would have resulted in the selection of the most similar, in particular identical, driving actions is selected. The selected driver type-specific cluster advantageously optimizes the function $$j = \mathrm{argmin} \frac{1}{|D_D|} \sum_{(x,a) \in D_D} L(x, a, \pi_j),$$

where $L(x, a, \pi_j)$ is a distance measure that compares observed state action tuples to driving strategy $\pi_j$ of the driver type-specific cluster. Similarly, the driver type-specific cluster whose application would have resulted in the selection of the most similar, in particular identical, driving actions is selected.

In a further preferred specific embodiment of the present invention, it is provided that identification 330 of a driver type-specific cluster $c_j$ includes: evaluating the driving behavior based on control parameters $\theta_j$ as a function of a control situation. Control parameter $\theta_j$ that is learned with application of the inverse reinforcement learning method is advantageously used for identifying a cluster. Based on the selected driving actions, for example acceleration, braking, steering, etc., the behavior of the driver is compared, in particular over a certain time period, to that of learned driving strategy controller strategy $\pi_{\theta j}$ of the selected control situation, and the driver type-specific cluster whose application would have resulted in the selection of the most similar, in particular identical, driving actions is selected. The selected driver type-specific cluster advantageously optimizes the function $$j = \operatorname{argmin} \frac{1}{|D_D|} \sum_{(x,a) \in D_D} L(x, a, \pi_{\theta j}),$$

where L (x, a, $\pi\theta j$) is a distance measure that compares observed state action tuples to driving strategy $\pi_{\theta j}$. Similarly, the driver type-specific cluster whose application would have resulted in the selection of the most similar, in particular identical, driving actions is selected.

Figure 3:
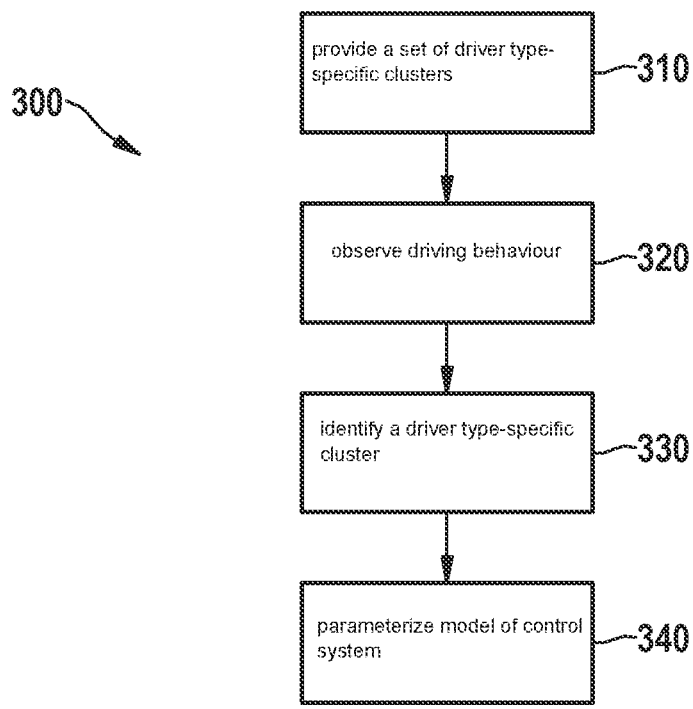
FIG. 3 shows a schematic illustration of steps of a method for using a control system, in accordance with an example embodiment of the present invention.
Figure 4:
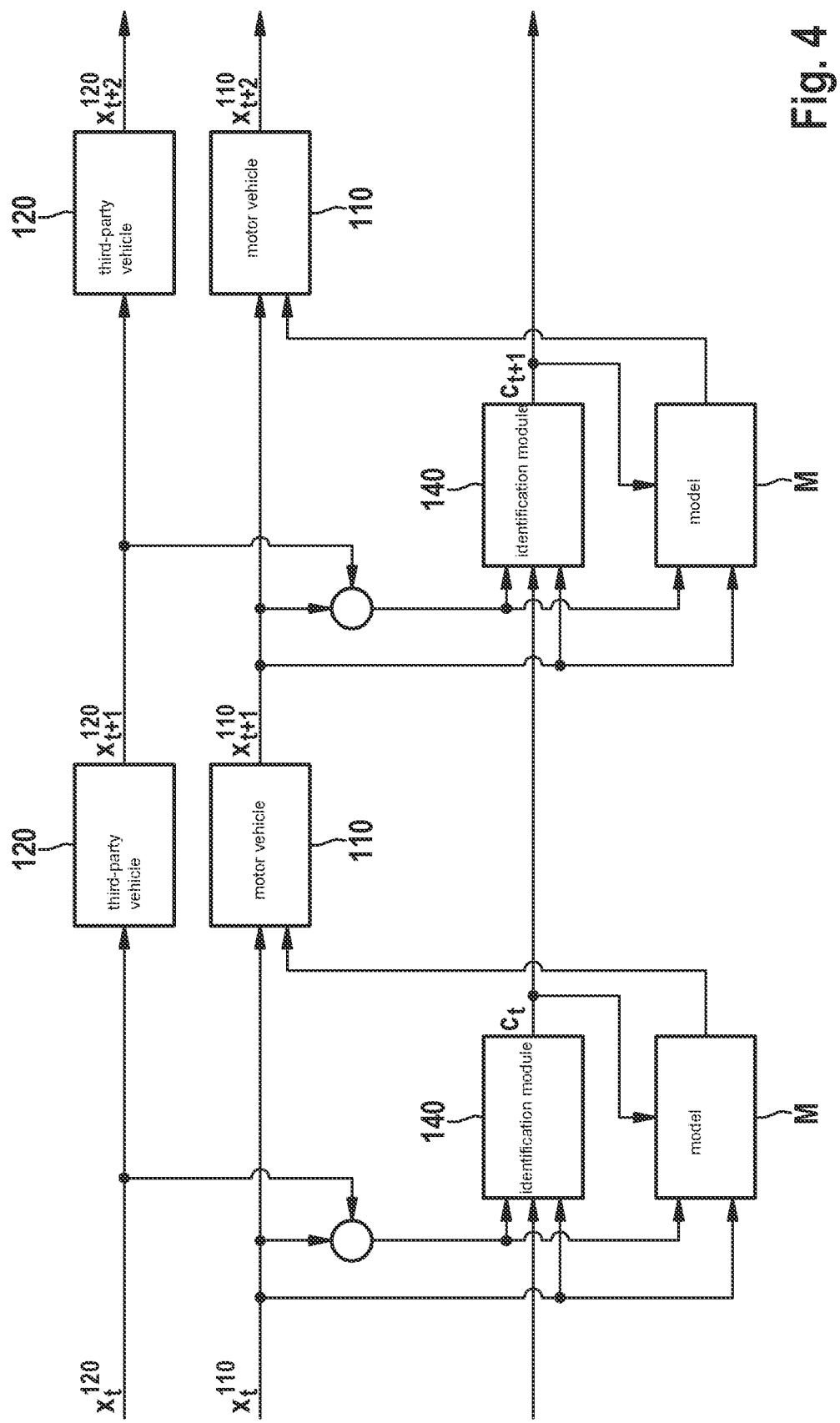
FIG. 4 shows a schematic overview of the method from FIG. 3.

FIG. 4 shows a schematic overview of the method from FIG. 3.

Control system 100 includes a model M, in particular an adaptive driver model. Model M is parameterized using control parameters $\theta_j$ of selected driver type-specific cluster $c_j$, and the control system is used for controlling the motor vehicle, in particular a driving operation of motor vehicle 110.

$x_t^{110}$ describes the state of host vehicle 110, and $x_t^{120}$ describes the state of a reference object, in particular third-party vehicle 120, at a point in time t.

Control system 100 also includes an identification module 140 for identifying a driver type-specific cluster $c_j$. The identification takes place according to above-described method 300 according to the described specific embodiment at a point in time t. Model M is parameterized using control parameters $\theta_j$ of driver type-specific cluster $c_t$ selected at point in time t, and the control system is used for controlling the motor vehicle, in particular a driving operation of motor vehicle 110.

After a time increment, at point in time t+1 vehicle 110 as well as reference object 120, in particular a third-party vehicle, in particular a preceding vehicle, have moved, in particular moved relative to one another and/or moved further, and steps of the method for controlling a motor vehicle using a control system, in particular the step for identifying a driver type-specific cluster and/or the parameterization of the control system using control parameters $\theta_j$ of the identified driver type-specific cluster, are carried out anew at point in time t+1. Method 300 may advantageously be carried out iteratively during a driving operation of motor vehicle 110.

What is claimed is:

1. A computer-implemented method for using machine learning to determine control parameters for a control system of a motor vehicle for controlling a driving operation of the motor vehicle, the method comprising the following steps:
providing a set of travel trajectories;
deriving respective reward functions from respective ones of the travel trajectories, using an inverse reinforcement learning method;
clustering groups of the derived reward functions into respective driver type-specific clusters based on degrees of similarity between different ones of the derived reward functions, wherein, for a particular state, different control parameters are generatable for the controlling of the driving operation of the motor vehicle depending on which of the driver type-specific clusters is used;
assigning a current driver of the motor vehicle to one of the driver type-specific cluster; and
using the assigned the driver type-specific cluster to generate the control parameters by which the driving operation is controlled.

2. The method as recited in claim 1, wherein the travel trajectories include operating data of the motor vehicle and/or reference data of the motor vehicle concerning surroundings of the motor vehicle, and the reward function of each of the driver type-specific clusters takes into account the operating data and/or the reference data.

3. The method as recited in claim 1, wherein a driver type-specific driving strategy is computed for the driver type-specific cluster.

4. The method as recited in claim 1, wherein the control parameters of each of the driver type-specific clusters are optimized as a function of the reward function of the driver type-specific cluster and/or as a function of operating data of the motor vehicle and/or as a function of reference data of the motor vehicle concerning surroundings of the motor vehicle.

5. The method as recited in claim 1, wherein the control parameters are optimized for at least one control situation.

6. A method for controlling a motor vehicle using a control system, the method comprising the following steps:
providing a set of driver type-specific clusters, each of the driver-type specific clusters including a reward function and control parameters, the driver type-specific clusters and/or control parameters having been determined by:
providing a set of travel trajectories;
deriving respective reward functions from respective ones of the travel trajectories, using an inverse reinforcement learning method;
clustering groups of the derived reward functions into respective ones of the driver type-specific clusters based on degrees of similarity between different ones of the derived reward functions, wherein, for a particular state, different control parameters are generatable for the controlling of the motor vehicle depending on which of the driver type-specific clusters is used;
observing a driving behavior of a driver of the motor vehicle in a driving operation of the motor vehicle;
assigning one of the driver type-specific clusters to the driver of the motor vehicle based on the observed driving behavior; and
parameterizing a model of the control system using the control parameters generatable by the use of the assigned driver type-specific cluster.

7. The method as recited in claim 6, wherein the assigning of the driver type-specific cluster includes: evaluating the driving behavior based on the reward functions of the driver type-specific clusters.

8. The method as recited in claim 6, wherein the assigning of the driver type-specific cluster includes: evaluating the driving behavior based on a driver type-specific driving strategy of the driver.

9. The method as recited in claim 6, wherein the assigning of the driver type-specific cluster includes: evaluating the driving behavior based on the control parameters as a function of a control situation.

10. A control system for a motor vehicle for controlling a driving operation of the motor vehicle based on reward functions that are respectively derived from respective ones of a set of travel trajectories using an inverse reinforcement learning method and groups of which are clustered into respective driver type-specific clusters based on degrees of similarity between different ones of the derived reward functions, wherein different control parameters are generatable for the controlling of the driving operation of the motor vehicle depending one which of the driver type-specific clusters is used, the control system comprising:
- an identification module configured to observe a driving behavior of a driver of the motor vehicle in a driving operation of the motor vehicle, assign one of the driver type-specific clusters to the driver of the motor vehicle based on the observed driving behavior; and
- a controller configured to output at least one control variable using a model, the model being parameterized using the control parameters generatable by the use of the assigned driver type-specific cluster.

11. The control system as recited in claim 10, wherein the model maps a behavior of the motor vehicle and a behavior of surroundings of the motor vehicle.

* * * * *